United States Patent
Klein et al.

(10) Patent No.: US 12,486,402 B2
(45) Date of Patent: *Dec. 2, 2025

(54) POLYMER-MODIFIED BITUMEN, METHOD OF PRODUCTION AND USE THEREOF FOR ASPHALT

(71) Applicant: LANXESS Deutschland GmbH, Cologne (DE)

(72) Inventors: Thomas Klein, Heidelberg (DE); Thomas Rossrucker, Ostringen (DE); Sandra Horstmann, Neuhofen (DE)

(73) Assignee: LANXESS Deutchland GmbH, Cologne (DE)

( * ) Notice: Subject to any disclaimer, the term of this patent is extended or adjusted under 35 U.S.C. 154(b) by 763 days.

This patent is subject to a terminal disclaimer.

(21) Appl. No.: 17/633,222

(22) PCT Filed: Aug. 5, 2020

(86) PCT No.: PCT/EP2020/072037
§ 371 (c)(1),
(2) Date: Feb. 7, 2022

(87) PCT Pub. No.: WO2021/028290
PCT Pub. Date: Feb. 18, 2021

(65) Prior Publication Data
US 2022/0306865 A1    Sep. 29, 2022

(30) Foreign Application Priority Data

Aug. 9, 2019 (EP) .................................. 19191079

(51) Int. Cl.
*C08L 95/00* (2006.01)
(52) U.S. Cl.
CPC ........... *C08L 95/00* (2013.01); *C08L 2555/34* (2013.01); *C08L 2555/52* (2013.01)
(58) Field of Classification Search
CPC .......... C08L 95/00; C08L 53/02; C08K 5/372
See application file for complete search history.

(56) References Cited

U.S. PATENT DOCUMENTS 4,554,313 A    11/1985    Hagenbach et al.

OTHER PUBLICATIONS

European Search Report from corresponding European Application No. 19191079, dated Oct. 15, 2019, two pages.
I. Franta, "Elastomers and Rubber Compounding Materials", Elsevier, 1989, pp. 88-92.

*Primary Examiner* — Catherine S Branch
*Assistant Examiner* — Olga Lucia Donahue
(74) *Attorney, Agent, or Firm* — Nicanor A. Kohncke; Christopher L. McDavid; Ewa M. Wozniak

(57) ABSTRACT

The present invention relates to polymer-modified bitumen, to a process for production thereof and to the use thereof for asphalt.

13 Claims, No Drawings

POLYMER-MODIFIED BITUMEN, METHOD OF PRODUCTION AND USE THEREOF FOR ASPHALT

The present invention relates to polymer-modified bitumen, to a process for production thereof and to the use thereof for asphalt.

PRIOR ART

Polymers as an additive for modifying bitumen have attracted particular attention in the last decades. Polymers, for example copolymers of the type styrene-butadiene (SBR) or styrene-butadiene-styrene (SBS), improve the constancy of the viscoelastic properties of the thus-modified bitumen with temperature. The stability of the asphalt blanket containing the modified bitumen to deformation by heavy goods traffic during the summer months shall especially be increased.

It is known that stability and technical performance (especially of polymer-modified bitumen ("PMB")) may be further enhanced by crosslinking of for example SBR or else SBS copolymers using sulfur (U.S. Pat. No. 4,554,313). Alkyl polysulfides of the type $R-S_{(x)}-R$ (R=alkyl chain, $S_{(x)}=x$ directly interlinked sulfur atoms) have been employed as an alternative to elemental sulfur. The advantage over the use of elemental sulfur is the higher homogeneity of distribution of the reactive sulfur in the bitumen polymer mixture with corresponding advantages during crosslinking of the polymer (U.S. Pat. No. 4,554,313). In addition the use of alkyl polysulfides reduces the emission of hydrogen sulfide liberated in a side reaction during crosslinking. (U.S. Pat. No. 7,608,650)

U.S. Pat. No. 4,554,313 discloses a multiplicity of dialkyl polysulfides of formula $R-S_{(x)}-R$ where $R=C_6$ to $C_{16}$ and x=2 to 5 for use in bitumen. Di-tert-dodecyl-pentasulfide and dinonyl-pentasulfide are favoured. However, these have the disadvantage that on account of less effective crosslinking and thus less pronounced elastic properties they are less able to withstand the stress conditions on the road than the alkyl polysulfides according to the invention.

Problem Addressed by the Present Invention

Starting from the above-described prior art it is an object of the present invention to produce polymer-modified bitumen which compared to the prior art exhibits an improved elastic recovery and a low susceptibility to deforming forces at low sulfur content.

It has surprisingly been found that this object can be achieved when the copolymers of the type styrene-butadiene (SBR) or styrene-butadiene-styrene (SBS) in the bitumen are vulcanized with $C_7$-$C_8$-dialkyl polysulfides. The polymer-modified bitumen according to the invention exhibits improved elastic recovery and a very low susceptibility to deforming forces.

Subject Matter of the Invention

The present invention provides a polymer-modified bitumen obtainable when styrene-butadiene copolymers, optionally dissolved in oil, are admixed with the bitumen at temperatures of at least 150° C. and subsequently the dialkyl polysulfides of formula (I)

$$R^1-S_{(x)}-R^2 \quad (I),$$

wherein $R^1$ and $R^2$ are identical or different and represent a linear or branched $C_7$-$C_8$-alkyl radical and x represents numbers from 3 to 8, are admixed.

PREFERRED EMBODIMENTS OF THE INVENTION

The styrene-butadiene copolymers (SBR) are rubbers composed of 1,3-butadiene and styrene.

Styrene-butadiene copolymers are particularly preferably composed of 40-99% by weight of 1,3-butadiene and 1-60% by weight of styrene.

Preferred SBR copolymers are styrene-butadiene-styrene (SBS) block copolymers.

The styrene-butadiene copolymers employed may be commercially available products; however they may also be produced by emulsion polymerization, see in this regard for example I. Franta, Elastomers and Rubber Compounding Materials, Elesevier, Amsterdam 1989, pages 88 to 92.

The dialkyl polysulfides of formula (I) serve as a sulfur source for the vulcanization of styrene-butadiene copolymers or styrene-butadiene-styrene (SBS) block copolymers.

The employed dialkyl polysulfides of formula (I) are preferably dialkyl polysulfides in which $R^1$ and $R^2$ are identical or different and represent a linear or branched $C_8$-alkyl radical and x represents numbers from 3 to 8.

The dialkyl polysulfides may be employed in the process according to the invention either individually or in any desired blend with one another.

In a further embodiment of the invention dioctyl pentasulfide and/or dioctyl tetrasulfide are preferred as the dialkyl polysulfide of formula (I).

The abovementioned $C_7$-$C_8$-dialkyl polysulfides are likewise commercially available products.

The amount of $C_7$-$C_8$-dialkyl polysulfide is preferably 0.1% to 1% by weight, particularly preferably 0.2% to 0.8% by weight, based on the mass of the copolymer-bitumen mixture.

Bitumen refers to a mixture of different organic substances which is either naturally occurring or is obtained by distillation from crude oil. Owing to its biological origin, bitumen consists mainly of carbon and hydrogen. It is a nonvolatile, dark-colored multisubstance mixture of organic substances whose viscoelastic behaviour changes with temperature. Employable bitumens in the context of the invention include all commercially available bitumen types, for example 50/70 or 70/100. This preferably includes road-building bitumen according to DIN EN 12591.

In a particular embodiment of the process according to the invention the styrene-butadiene copolymers are employed dissolved in at least one mineral oil before they are mixed with the bitumen.

Oils in the context of the present invention include naphthenic oils, for example "Nynas T 22" or paraffin-based raffinates, also known by the term RAE (residual aromatic extract) according to the EU Substance Directive, such as for example the process and plasticizer oil "Shell Flevex 595".

Admixing of the styrene-butadiene copolymers with the bitumen is preferably followed by metered addition of the dialkyl polysulfides of formula (I). Metered addition is preferably carried out under mechanical stress using mixing units, such as preferably internal mixers, high-pressure homogenizers, in particular high shear mixing apparatuses, for example Ultra-Turrax®. On a large industrial scale particular preference is given to the use of internal mixers, but the type of internal mixer is not subject to any particular restriction. On a laboratory scale the high-shear mixing apparatus is for example an Ultra-Turrax®, particularly preferably also an anchor stirrer having at least 2 blades.

When using an internal mixer for generating mechanical stress, preference is given to internal mixers having intermeshing or tangential rotors. Particular preference is given to an internal mixer having intermeshing rotors since this makes it possible to introduce more shear energy.

The stirring speed may be adjusted according to the viscosity of the polymer-modified bitumen (PMB); in the case of an anchor stirrer having at least 2 blades the stirrer speed is preferably 150 rpm to 500 rpm, particularly preferably 180-250 rpm.

The temperature during mixing is preferably 150° C. to 250° C., particularly preferably 160° C. to 180° C.

The mixing time under mechanical stress is for the mixing of the styrene-butadiene copolymers with the bitumen preferably 60 to 480 minutes, particularly preferably 60 to 240 minutes and for the mixing of the dialkyl polysulfide of formula (I) into the styrene-butadiene copolymer-bitumen mixture preferably 1 to 60 minutes, particularly preferably 5 to 10 minutes.

After the mixing of the dialkyl polysulfide of formula (I) the end of the vulcanization may preferably be detected by the lack of any further viscosity increase.

When employing the styrene-butadiene copolymers in oil it is preferable when the weight ratio of oil to styrene-butadiene copolymer is 9:1 to 1:1, preferably 7:1 to 3:1.

The present invention likewise provides the process for producing the polymer-modified bitumen according to the invention in which styrene-butadiene copolymers, optionally dissolved in oil, are admixed with the bitumen at temperatures of at least 150° C. and subsequently the dialkyl polysulfides of formula (I) $R^1$—$S_{(x)}$—$R^2$ (I), wherein $R^1$ and $R^2$ are identical or different and represent a linear or branched $C_7$-$C_8$-alkyl radical and x represents a number from 3 to 8, are admixed.

In terms of the process for producing polymer-modified bitumen, reference is made to the foregoing relating to the polymer-modified bitumen according to the invention in respect of the definitions of x, $R^1$ and $R^2$, the aggregate, the input materials and the process parameters, such as temperature and the employed mixing units, and also the preferred embodiments.

Further Preferred Embodiment

In one embodiment the polymer-modified bitumen comprises further additives, such as metal compounds/salts, in particular organic zinc compounds/salts, inter alia as sulfide scavengers and thus as odor neutralizers.

The amount of additives is preferably 0.1% to 1% by weight.

In a further preferred embodiment the polymer-modified bitumen is subsequently admixed with aggregate.

In the context of the present invention aggregate preferably refers to natural aggregate granulations, preferably according to DIN EN 13043, which have preferably been subjected to mechanical workup, for example crushing and screening.

Aggregate granulations used for asphalt mixture for the construction of trafficked areas must meet the requirements of DIN EN 13043 and/or TL Gestein-StB 04. Asphalt top layer mixture consists of aggregate granulations up to a maximum particle size of 16 mm.

The requirements of aggregate granulations are defined inter alia in DIN 18196 Bodenklassifikation für bautechnische Zwecke and den Technischen Lieferbedingungen für Gesteinskörnung im Straßenbau, TL Gestein-StB, 2004 Edition (page 11).

The aggregate is preferably either in unbroken form (as round grain), in particular in the form of shingle, sand, gravel and grit, or in broken form.

The amount of aggregate is preferably up to 95% by weight, preferably 90% to 95% by weight, based on the total amount of polymer-modified bitumen.

The aggregate is preferably mixed with the polymer-modified bitumen under mechanical stress, preferably using stirring units.

In cases where the polymer-modified bitumen also comprises aggregate this is referred to as asphalt.

Further Subject Matter of the Invention

The present invention further provides asphalt comprising the bitumen polymer-modified according to the invention.

In terms of the process for producing polymer-modified bitumen, reference is made to the foregoing relating to the polymer-modified bitumen according to the invention in respect of the definitions of x, $R^1$ and $R^2$, the aggregate, the input materials and the process parameters, such as temperature and the employed mixing units, and also the preferred embodiments.

In the context of the invention asphalt is a naturally or industrially produced mixture comprising polymer-modified bitumen and aggregate (aggregate granulations). It is preferably used in roadbuilding for roadway systems, in high-rise construction for floor coverings, in waterway construction and in landfill construction for sealing. The mixing ratio is preferably 90-95% by weight aggregate/aggregate granulation and about 5-10% by weight bitumen. However, this ratio may be altered upwards or downwards. The admixed amount (so-called binder content) and the hardness of the bitumen (i.e. binder type) substantially alter the material characteristics.

The function of the bitumen which makes up preferably 4-7% of the road surface is that of a binder for the aggregate scaffold.

The present invention further provides for the use of the polymer-modified bitumen according to the invention in high-rise construction for sealing building parts against water, for example bitumen roof membranes for roof sealing, for protection of steel against corrosion and in road-building as a binder for aggregate granulations in asphalt, preferably as a road surface.

The present invention is elucidated in detail by the examples which follow, but the present invention is no way restricted to the examples.

WORKING EXAMPLES

Materials Employed:
SBS, Kraton® D1101, a linear unhydrogenated SBS/SB block copolymer from Kraton Polymers LLC where SBS=styrene-butadiene-styrene block copolymer SB=styrene-butadiene diblock having a polystyrene proportion of 29-33%.
Kraton® D 1102, a linear unhydrogenated SBS/SB block copolymer from Kraton Polymers LLC where SBS=styrene-butadiene-styrene block copolymer SB=styrene-butadiene diblock having a polystyrene proportion of 26.8-30%.
Nynas T 400: naphthenic oil from Nynas AB.

Di-tert-dodecyl pentasulfide from Arkema having the product description TPS® 32.

Dioctyl pentasulfide 40% sulfur employed as Additin® RC 2540 from Lanxess Deutschland GmbH.

Example 1 (Comparative Example)

Analogously to U.S. Pat. No. 4,554,313, 12 g of the SBS copolymer (SBS, Kraton® 1101) were mixed with 32 g of Nynas T 400 oil at 170° C. This solution was then added to 366 g of bitumen (bitumen 50/70) to afford a solution of 3% by weight of polymer in a bitumen-oil mixture. Subsequently 0.32% by weight of di-tert-dodecyl pentasulfide comprising 32% sulfur (this corresponds in the reaction batch to a sulfur proportion of 0.1% by weight based on the reaction mixture) were added as shown in table 1 and vulcanized for 2 hours by heating to 170° C.

The thus-obtained composition was then used to cast a DSR test specimen and the MSCR test was performed for 3 stress levels at 60° C. The results are reported in table 1.

Example 1 (Inventive)

A solution of 12 g of the polymer (SBS, Kraton® 1101) in 32 g of the oil Nynas T 400 was initially produced at 170° C. This solution was added to 366 g of bitumen to result in a solution of 3% by weight of polymer in a bitumen-oil mixture. Subsequently 0.25% by weight of di-octyl pentasulfide comprising 40% sulfur (this corresponds in the reaction batch to a sulfur proportion of 0.1% by weight based on the reaction mixture) were added as shown in table 1 and crosslinking was carried out by heating to 170° C. for 2 hours.

The dynamic shear rheometer ("DSR") has proven advantageous for determining the viscoelastic properties, for instance the elastic recovery, of modified bitumens. To determine the elastic properties a "Multiple Stress Creep and Recovery Test (MSCR test)" was performed according to DIN EN 16659 (2013). This MSCR method ("multiple stress creep recovery") constitutes a simple method which at elevated temperature such as for instance 60° C. makes it possible to achieve rapid determination of the recoverable proportion of a performed deformation in percent ("R value"). The J value indicates a ratio of permanent deformation to employed force and is therefore a measure of the susceptibility of the binder to deforming forces.

The compositions obtained from the examples 1V and 1E were then used to cast a DSR test specimen and the MSCR test was performed for 3 stress levels at 60° C. In this test, which better reflects the stress conditions on the road than oscillating DSR measurements, the recovery in percent (R-value) was determined in 10 stress cycles comprising a stress phase with constant shear stress of 1 second duration and a subsequent destress phase of 9 seconds duration. This test was performed with three stress levels of 0.1 kPa, 1.6 kPa and 3.2 kPa. The deformations during the force-controlled cycles were captured with subdivision into three deformation magnitudes.

The results are listed in Table 1.

TABLE 1

| | DSR MSCR test results | |
|---|---|---|
| Crosslinker | Example 1E (inventive) 0.1% by weight S in the form of dioctyl(C8) pentasulfide | Example 1V 0.1% by weight S in the form of di-tert-dodecyl(C12) pentasulfide |
| R % 0.1 kPa | 33.84 | 26.63 |
| R % 1.6 kPa | 10.32 | 6.14 |
| R % 3.2 kPa | 2.68 | 0.34 |
| J 1/kPa 0.1 kPa | 1.9040 | 2.2371 |
| J 1/kPa 1.6 kPa | 2.9857 | 3.3451 |
| J 1/kPa 3.2 kPa | 3.7305 | 4.1041 |

For each stress level the R value for elastic recovery was highest, and the J value for susceptibility to deformation lowest, for dioctyl pentasulfide despite metered addition of the same sulfur content.

Example 2 (Inventive) without Oil

Initially 12 g of the more soluble polymer SBS, Kraton® 1102 was added to 366 g of bitumen at 180° C. to form a solution of 3% by weight of polymer in bitumen. Subsequently 0.25% by weight of dioctyl pentasulfide comprising 40% sulfur (S proportion=0.1% by weight) were added according to table 1 and the crosslinking was performed by heating to 170° C. for 2 hours.

TABLE 2

| | DSR MSCR test results | | |
|---|---|---|---|
| | Kraton ® 1102, uncrosslinked | Kraton ® 1102 crosslinked with 0.1% by weight S in the form of dioctyl(C8) pentasulfide | Kraton ® 1102 crosslinked with 0.1% by weight S in the form of di-tert-dodecyl(C12) pentasulfide |
| R % 0.1 kPa | 5.73 | 14.92 | 14.35 |
| R % 1.6 kPa | 3.26 | 10.7 | 9.91 |
| R % 3.2 kPa | 1.38 | 6.14 | 5.32 |

In this experiment, too, the $C_8$-dialkyl polysulfide showed the best elastic recovery, as is apparent from table 2.

What is claimed is:

1. Polymer-modified bitumen obtained by one or more styrene-butadiene copolymers, optionally dissolved in oil, are admixed with the bitumen at temperatures of at least 150° C. and subsequently the dialkyl polysulfides of formula (I)

$$R^1\text{—}S_{(x)}\text{—}R^2 \qquad (I),$$

in which $R^1$ and $R^2$ are identical or different and represent a linear or branched $C_8$-alkyl radical and x represents 5, are admixed.

2. The polymer-modified bitumen according to claim 1 wherein the one or more styrene-butadiene copolymers are composed of 40-99% by weight of 1,3-butadiene and 1-60% by weight of styrene.

3. The polymer-modified bitumen according to claim 1, wherein the one or more styrene-butadiene copolymers are styrene-butadiene-styrene (SBS) block copolymers.

4. The polymer-modified bitumen according to claim 1, wherein the dialkyl polysulfide of formula (I) is employed in an amount of 0.1% to 1% by weight, based on the amount of the one or more styrene-butadiene copolymers.

5. The polymer-modified bitumen according to claim 2, wherein the dialkyl polysulfide of formula (I) is employed in an amount of 0.2% to 0.8% by weight, based on the amount of the one or more styrene-butadiene copolymers.

6. The polymer-modified bitumen according to claim 1, wherein the one or more styrene-butadiene copolymers are dissolved in at least one mineral oil before they are mixed with the bitumen.

7. The polymer-modified bitumen according to claim 6, wherein the at least one mineral oil is a naphthenic oil.

8. The polymer-modified bitumen according to claim 6, wherein the weight ratio of oil to styrene-butadiene copolymer is 9:1 to 1:1.

9. The polymer-modified bitumen according to claim 8, wherein the weight ratio of oil to styrene-butadiene copolymer is 7:1 to 3:1.

10. Asphalt comprising the polymer-modified bitumen according to claim 1.

11. A roofing membrane comprising the polymer-modified bitumen according to claim 1.

12. A coating for protecting steel against corrosion comprising the polymer-modified bitumen according to claim 1.

13. The polymer-modified bitumen according to claim 1, wherein the one or more styrene-butadiene copolymers are admixed with the bitumen at temperatures ranging from 160° C. to 250° C.

* * * * *